(12) United States Patent
Williamson (10) Patent No.: US 6,550,418 B2
(45) Date of Patent: Apr. 22, 2003

(54) WIND DETECTION AID

(76) Inventor: Vance Williamson, 3041 Brook Highland Dr., Birmingham, AL (US) 35242

( * ) Notice: Subject to any disclaimer, the term of this patent is extended or adjusted under 35 U.S.C. 154(b) by 159 days.

(21) Appl. No.: 09/820,602

(22) Filed: Mar. 30, 2001

(65) Prior Publication Data

US 2002/0139290 A1 Oct. 3, 2002

(51) Int. Cl.$^7$ ................................................ G01P 13/02
(52) U.S. Cl. ................................... 116/264; 73/170.04
(58) Field of Search ...................... 116/200, 1, DIG. 1, 116/214, 265, 273, 264; 73/170.04, 170.05; 42/1.01; 124/86, 87, 88, 89, 90

(56) References Cited

U.S. PATENT DOCUMENTS

| 3,112,645 | A |   | 12/1963 | Glass .................... 73/170.04 |
| 4,309,095 | A | * | 1/1982 | Buckley .................... 396/420 |
| 4,423,626 | A |   | 1/1984 | Herschede ............... 73/170.04 |
| 4,633,846 | A | * | 1/1987 | Ipock ....................... 124/23.1 |
| 4,640,258 | A | * | 2/1987 | Penney et al. ............. 124/24.1 |
| 4,726,348 | A | * | 2/1988 | Saunders ................... 124/23.1 |
| 4,955,356 | A | * | 9/1990 | Pike et al. .................... 124/89 |
| 5,186,118 | A |   | 2/1993 | Stinson ........................ 116/214 |
| 5,291,778 | A |   | 3/1994 | Dexheimer et al. ...... 73/170.05 |
| 5,302,938 | A | * | 4/1994 | Martineau ................ 340/573.2 |
| 5,406,733 | A | * | 4/1995 | Tarlton et al. ................. 42/119 |
| D360,370  | S | * | 7/1995 | Roth, Jr. ...................... D10/59 |
| 5,520,164 | A | * | 5/1996 | Huddleston .................. 124/86 |
| 5,595,137 | A | * | 1/1997 | Delmonte .................... 116/264 |

* cited by examiner

Primary Examiner—Christopher W. Fulton
Assistant Examiner—R. Alexander Smith
(74) Attorney, Agent, or Firm—Wm. Randall May (57) ABSTRACT

A refillable receptacle for housing and dispensing a fibrous, windborne material is disclosed. The receptacle includes a closure cap having one or more apertures for dispensing said fibrous material and has a threaded bottom for attachment to, and replacement of, the windage/elevation cap an optical scope. The threaded bottom also allows the device to be attached to an archery bow or bow stabilizer. The bottom of the device may also be adapted so as to allow attachment of the device to pliable articles such as fabric or clothing or to rigid articles such rails or platforms.

18 Claims, 6 Drawing Sheets

WIND DETECTION AID

BACKGROUND OF THE INVENTION

This invention relates generally to airflow detection devices and more specifically, to a new apparatus for housing and dispensing a fibrous material useful in determining wind direction and wind speed. The present invention is of particular use to sportsmen such as hunters or archers, marksmen or wildlife observers, or in any other activity, such as golf or sailing, where knowledge of wind direction, wind speed and thermals is very important and quite often critical.

Knowledge of wind direction and wind speed is especially important where any type of high speed projectile, such as a bullet, buckshot, arrow or golf ball, is being propelled over relatively long distances to reach and accurately contact desired or specified targets. Firearm and bow hunters, soldiers, law enforcement personnel and/or competitive marksmen all rely on knowledge of wind direction, wind speed and thermals in order to ensure or improve the accuracy of their shots and, in some instances, to protect their lives. This is particularly true for long range outdoor shots where knowledge of wind direction and wind speed will allow one to accurately compensate for the effects of wind drift on the projectile being shot thereby increasing the chances for success.

Hunters, without regard to the type of weapon used, and persons desiring to observe animals in the wild, must also closely monitor, and be constantly aware of, wind direction, wind shifts and thermals in order to avoid being detected or "winded" by the animal being observed or by the game or prey being hunted. Most game animals have a very keen sense of smell and a successful hunter or observer must frequently stop to check wind direction in order to stay downwind of the desired observation animal or intended prey. Experienced hunters and observers will therefore always strive to keep the wind in their face, regardless of how strong the breeze or air current may be, thereby significantly reducing the chances of the animal or prey picking up his or her human scent. Successful game hunters and observers will also remember to take daily thermals into account and have means available to check these currents at appropriate times during the day. For instance, in the evening when the atmosphere is cooling, the cooler air will tend to fall or sink thereby pushing air downhill. In the morning when the atmosphere is heating up, the warmer air will tend to rise thereby pulling air uphill. Monitoring these changes in daily thermals or air currents will allow a hunter or observer to avoid being "winded" by the observed animal or intended prey.

Present methods and devices for monitoring and checking wind direction include the use of lighters or matches to observe the direction or movement of the generated flame, puff bottles filled with observable powder or mist which can be squeezed or otherwise caused to spray said powder or mist into the air for observation, strings attached to the end of a rifle barrel and the use of dust or other free floating material which can be dropped from a hand-held container. However, while these prior art methods and devices are somewhat effective and may enjoy marginal success in detecting wind direction, the noise, chemical odor, potential visual detection, handling and movement associated with the use of these methods and devices leave much room for improvement. Additionally, some of these methods and devices are weather sensitive and may not work properly or be effective in all weather conditions.

It would be expedient, therefore, to provide an improved method and apparatus for quickly, easily and accurately detecting wind direction, wind shifts, wind speed and thermals at all times, in any weather, without excessive movement, odor, or the necessity of propelling or spraying visually detectable and/or odorous substances into the air.

SUMMARY OF THE INVENTION

In view of the foregoing, it is a primary object of this invention to provide a wind detection apparatus or aid which eliminates the disadvantages of prior wind detection methods and devices. Further, it is also a primary object of this invention to provide a wind detection apparatus or aid which has been specially designed to replace the windage or elevation scope cap cover of a typical optical scope and which can be adapted to attach directly to an archery bow or archery bow stabilizer. Another object of this invention is to provide a wind detection apparatus or aid which can be attached to clothing or to structures such as hunting or observation platforms or tree stands.

According to an embodiment of the invention, a wind detection aid comprises a threaded receptacle for housing and dispensing a fibrous material which, when released, becomes airborne. Said receptacle includes a closure cap having one or more apertures for dispensing said fibrous material and a threaded bottom for attachment to, and replacement of, the windage or elevation cap of an optical scope, or for attachment to an archery bow or bow stabilizer. The bottom of said receptacle can also be adapted so as to allow the device to be attachable to clothing or to structural objects such as hunting or observation platforms or tree stands.

An advantage of the present invention is the provision of a wind detection aid an embodiment of which is specially designed as a replacement for the windage/elevation cap of a typical optical scope.

Another advantage of the present invention is the provision of a wind detection aid which is adaptable so as to mate with the male threads of a typical optical scope cap mechanism or the female threads of an auxiliary attachment port of a typical archery bow or bow stabilizer.

Another advantage of the present invention is the provision of a refillable wind detection aid which is convenient and which provides the ability to accurately and easily check wind direction at all times in any type of weather.

A further advantage of the present invention is the ability of the device to be attached directly to an archery bow or to an archery bow stabilizer.

Another advantage of the present invention is the provision of a wind detection aid which can be permanently mounted to an optical scope or archery bow.

Another advantage of the present invention is the provision of a wind detection aid which can be adapted to attach to clothing or to structural objects such as hunting or observation platforms, tree stands, sailing vessels or golf carts.

The invention is also particularly advantageous in that the attachment of the device to objects not likely to be left behind by a hunter, marksman or observer or the attachment of the device to stationary structures used by the hunter, marksman or observer ensures the device will always be available for use.

An important advantage of the present invention is the provision of a refillable wind detection apparatus or aid which allows the user to detect wind direction and speed without the necessity of spraying visually detectable or odorous materials into the air.

Another advantage of the present invention lies in the convenience of the device and the ability to use the device without excessive movement or handling by the user.

A further advantage of the present invention lies in the ability to attach the device to other optical devices such as binoculars or telescopes.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figures 1, 2, 3, 4:
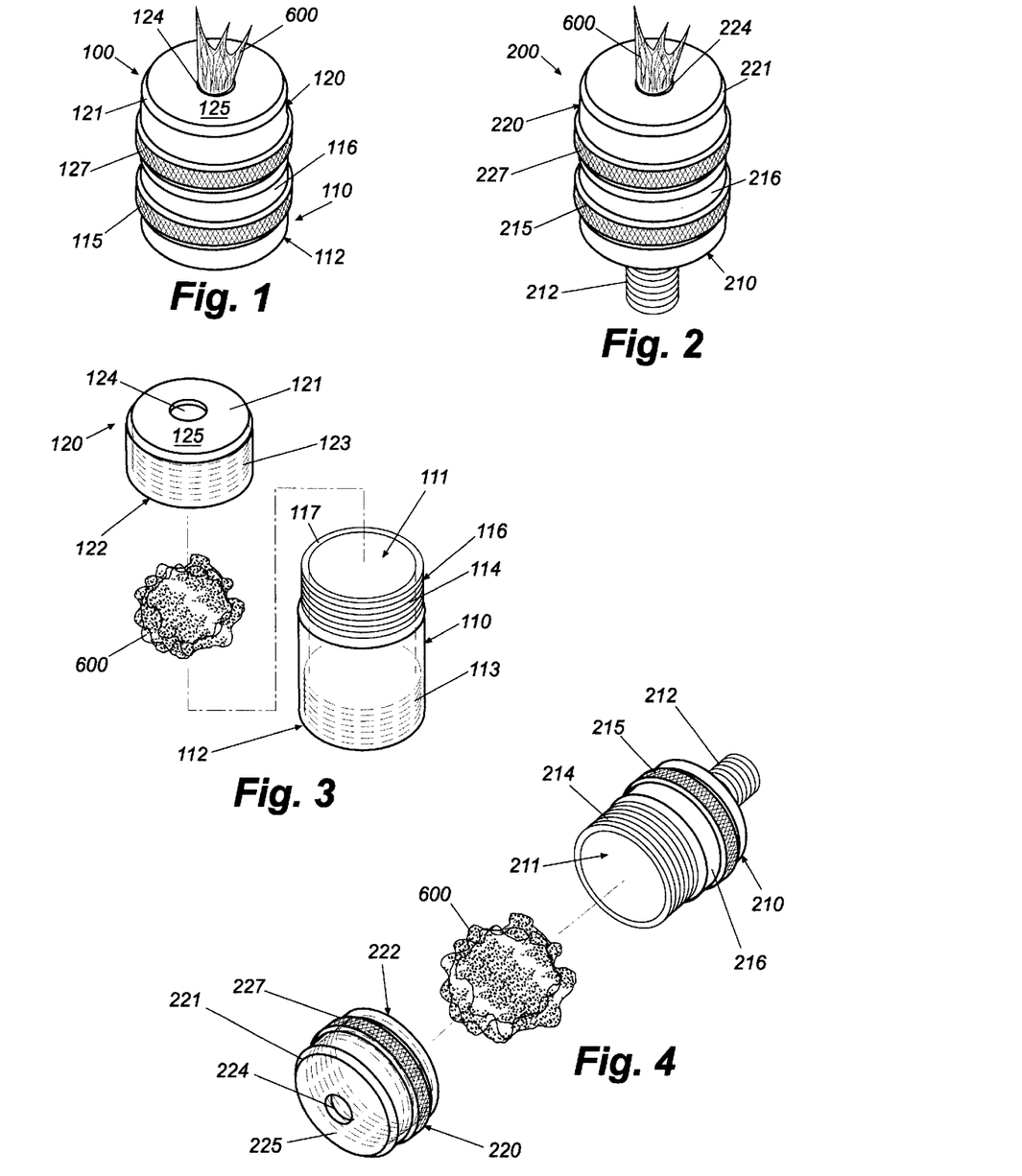
FIG. 1 is a perspective view of an embodiment of the present invention designed for use as a replacement for the windage or elevation adjustment mechanism cap of an optical scope. The embodiment of FIG. 1 is shown in an assembled, but detached, configuration.
FIG. 2 is a perspective view of an embodiment of the present invention designed for use as an attachment to archery bows or archery bow stabilizers. The embodiment of FIG. 2 is shown in an assembled, but detached, configuration.
FIG. 3 is a schematic exploded view of the embodiment of FIG. 1.
FIG. 4 is a schematic exploded view of the embodiment of FIG. 2.
Figure 17:
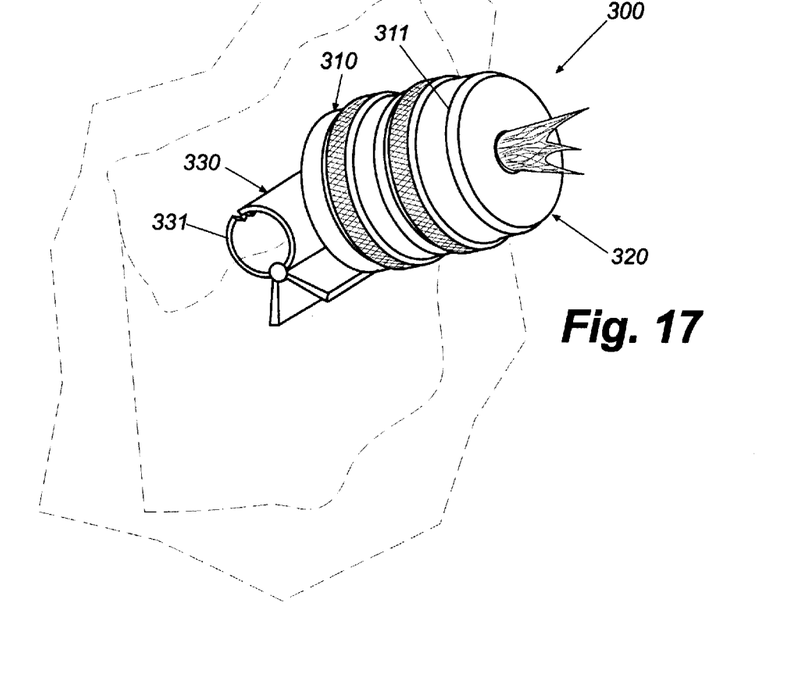
FIG. 17 is a perspective view of an embodiment of the present invention showing the invention with an attachment clip for securing the device to an article of clothing.
Figure 18:
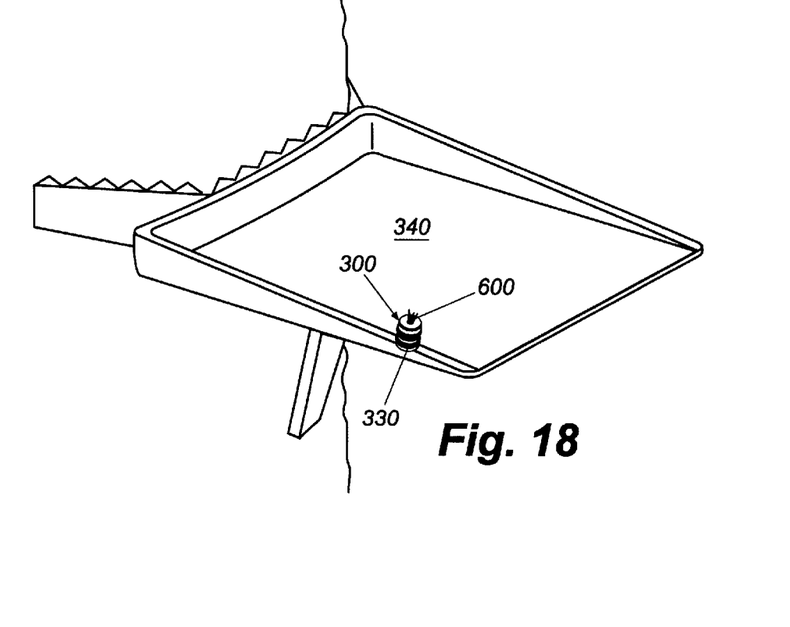
FIG. 18 is a perspective view of an embodiment of the present invention showing the invention attached to a typical hunting or observation platform.

In accordance with an embodiment of the invention, FIG. 1 shows a wind detection aid 100 designed to replace either (or both) the windage or elevation adjustment mechanism cap(s) of a typical optical scope. FIG. 2 shows an alternate embodiment 200 of the invention for use as an attachment to an archery bow or bow stabilizer. FIGS. 17 & 18 show an alternate embodiment 300 of the invention for use as an attachment to clothing or to structural objects such as hunting or observation platforms.

Figures 5, 6:
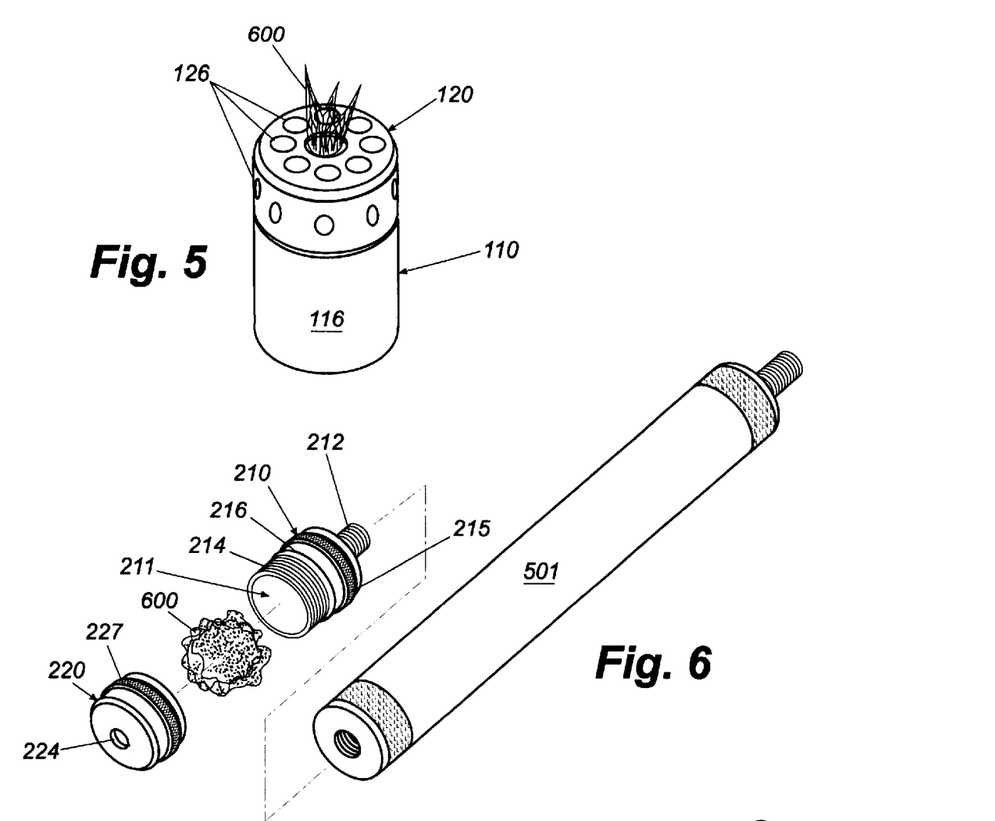
FIG. 5 is a schematic view of an alternate embodiment of the embodiment of FIG. 1 showing a multi-port dispensing cap.
FIG. 6 is a schematic exploded view of the embodiment of FIG. 2 shown as a retrofit attachment to a typical archery bow stabilizer.

The wind detection aid 100 of FIG. 1 comprises a cylindrical receptacle means 110 and a dispenser means 120. As best seen in FIG. 3, the cylindrical receptacle means 110 of the embodiment of FIG. 1 is dual chambered, having a first chamber means 111 at one end for housing a fibrous material 600 and a second chamber means 112 at its other end. Said second chamber means 112 having internal or female threads 113 for mating with, and for attachment to, the male threads 400 of the windage or elevation adjustment mechanism of a typical optical scope (see FIG. 8). A portion of the external surface 116 of the cylindrical receptacle means 110 has been machined or adapted so as to create external or male threads 114 for securing the dispenser means 120 to the open end 117 of said first chamber means 111. A portion of the external surface 116 of said receptacle means 110 may also be knurled 115 for better gripping when securing said receptacle means 110 to said optical scope. Said dispenser means 120 comprises a cap 121 having a hollow chamber 122 which, in the present embodiment, has been machined or adapted so as to provide female threads 123 for mating with the male threads 114 of said receptacle means 110. Said dispenser means 120 further comprising a circular opening or dispensing port 124 centrally positioned along its top surface 125 through which a portion of said fibrous material 600, housed within said first chamber means 111 of said receptacle means 110, may be pulled for later release and observation. It will be understood that the cap 121 of said dispenser means 120 may be attached to said first chamber means 111 by alternative means such as by friction fitting or other similar means to adequately secure the cap 121 in place. As shown in FIG. 5, the cap 121 of said dispenser means 120 may also contain multiple ports 126 for easier access to said fibrous material 600 or to allow a masking or attractant scent applied to said fibrous material 600, or contained within said dispenser means 120, to escape the dispenser means 120. A portion of the external surface of said dispenser means 120 may also be knurled 127 for better gripping when securing said dispenser means 120 to said receptacle means 110.

Figure 8:
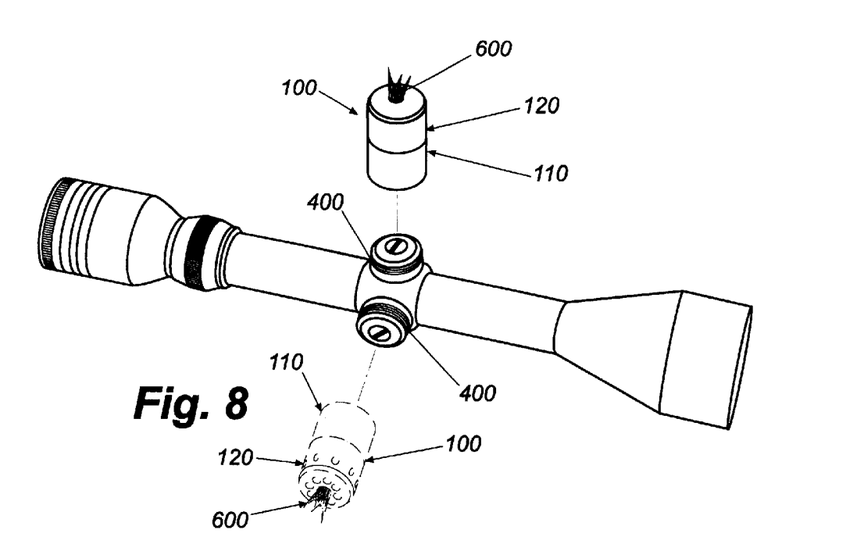
FIG. 8 is a schematic exploded view of the embodiments of FIGS. 1 and 5 showing the invention as it would be used to replace either (or both) the windage or elevation adjustment mechanism cap(s) of a typical optical scope.
Figure 9:
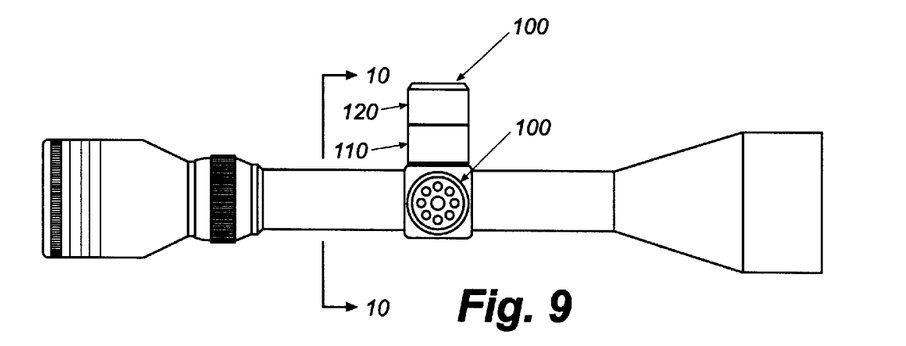
FIG. 9 is a plan view of the embodiments of FIG. 8
Figure 10:
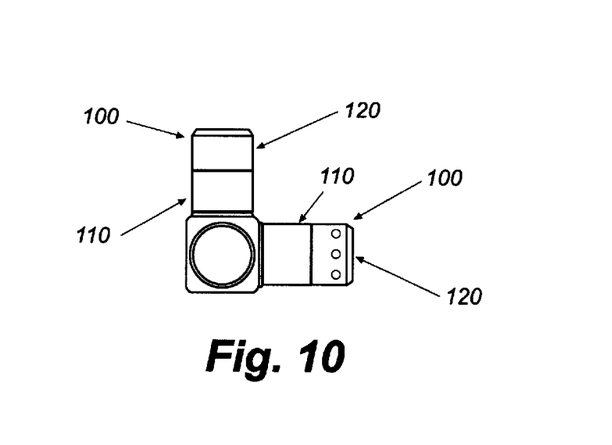
FIG. 10 is a cross-sectional view of the embodiments of FIG. 8 and FIG. 9.

As shown in FIGS. 8, 9 and 10, and as previously stated, the wind detection aid 100 of FIG. 1 is designed to replace one, or if desired both, of the cap covers for the windage or elevation adjustment mechanisms of a typical optical scope. The female threads 113 of said second chamber means 112 of said wind detection aid 100 are machined so as to precisely mate with the male threads 400 of the optical scope's adjustment mechanism thereby allowing the wind detection aid 100 to actually permanently "replace" the scope cover(s) for said adjustment mechanism(s).

Figure 16:
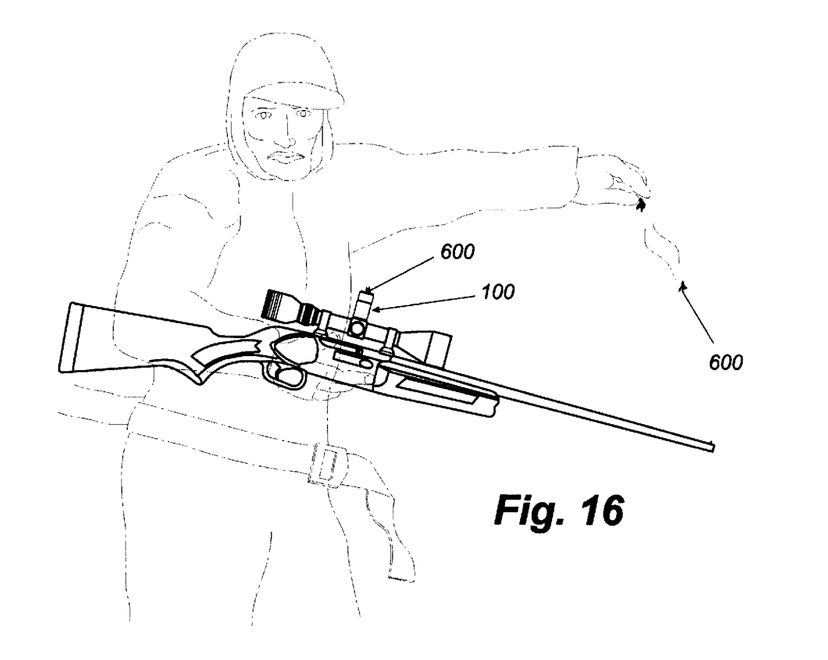
FIG. 16 is a perspective view of the embodiment of FIG. 15 showing the two invention being used with an optical scope mounted to a firearm.

As best seen in FIG. 16, the close proximity of the wind detection aid 100 of FIG. 1 to one's hands when the device 100 is attached to an optical scope, makes the device 100 very convenient to use and also limits or greatly reduces the movement required of the user when monitoring wind conditions. In use, a firearm marksman or wildlife observer, when desiring to check wind direction, wind speed or daily thermals, would simply remove a small bit of the fibrous material 600 from the cap 121 of said dispenser means 120 and would then release the material 600 into the ambient air for observation and tracking.

The wind detection aid 200 of FIG. 2 comprises a cylindrical receptacle means 210 and a dispenser means 220. The cylindrical receptacle means 210 of the embodiment of FIG. 2 comprises a chamber means 211 at one end for housing a fibrous material 600 and a threaded male stud 212 at its other end for mating with, and attachment to, the standardized female threads of an auxiliary attachment port of a typical archery bow. The receptacle means 200 may also be attached to the end of most archery bow stabilizers. As best seen in FIG. 4, a portion of the external surface 216 of the receptacle means 220 has been machined so as to create external or male threads 214 for securing the dispenser means 220 to the end of the chamber means 211. A portion of the external surface 216 of said receptacle means 210 may also be knurled 215 for better gripping when securing said receptacle means 210 to an archery bow or bow stabilizer. Said dispenser means 220 comprises a cap 221 having a hollow chamber 222 which, in the present embodiment, has been machined or adapted so as to provide internal or female threads 223 for mating with the external male threads 214 of said chamber means 211. A portion of the external surface of said dispenser means 220 may also be knurled 227 for better gripping when securing said dispenser means 220 to said receptacle means 210. Said dispenser means 220 further comprising a circular opening or dispensing port 224 centrally positioned along its top surface 225 through which a portion of said fibrous material 600, housed within said chamber means 211 of said receptacle means 210, may be pulled for later release and observation. As with the embodiment of FIG. 1, it will be understood that the cap 221 of said dispenser means 220 may be attached to said chamber means 21 1 by alternative means such as by friction fitting or by other similar means to adequately secure the cap 221 in place. As with the embodiment shown in FIG. 5, the cap 221 of said dispenser means 220 of the embodiment of FIG. 2 may also contain multiple ports 126 for easier access to said fibrous material 600 or to allow a masking or attractant scent applied to said fibrous material 600, or contained within said dispenser means 120, to escape the dispenser means 120.

Figure 7:
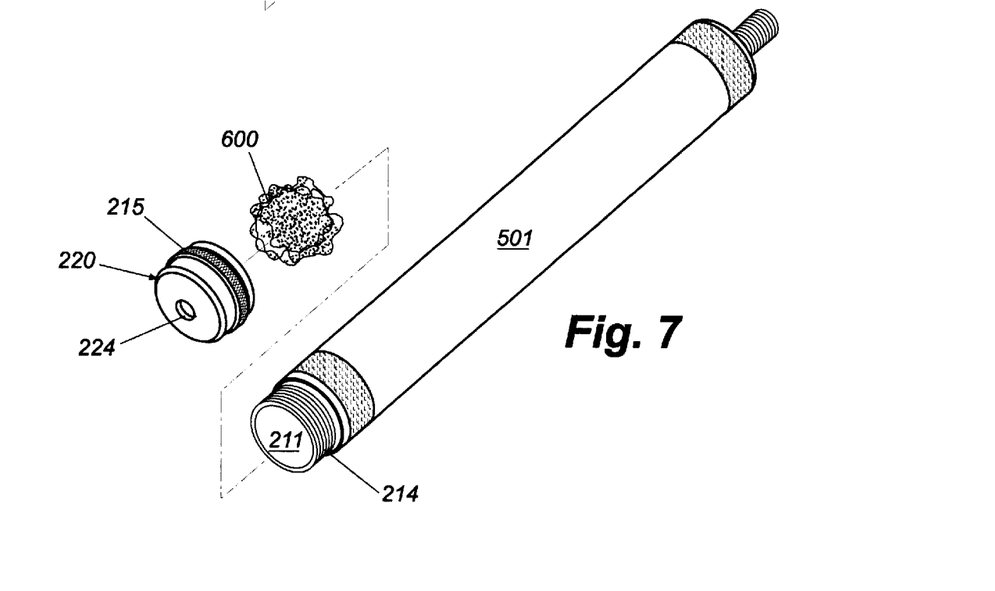
FIG. 7 is a schematic exploded view of the embodiment of the present invention shown as a homogenous or integral part of a typical archery bow stabilizer.
Figure 11:
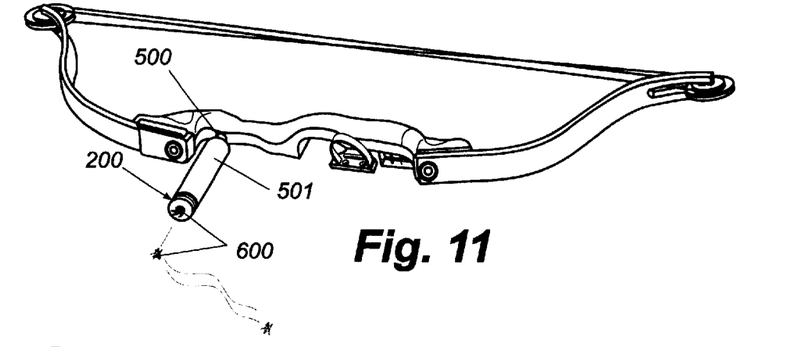
FIG. 11 is a schematic perspective view of a typical compound archery bow with an embodiment of the present invention shown attached or mounted to a typical bow stabilizer.
Figures 12, 13:
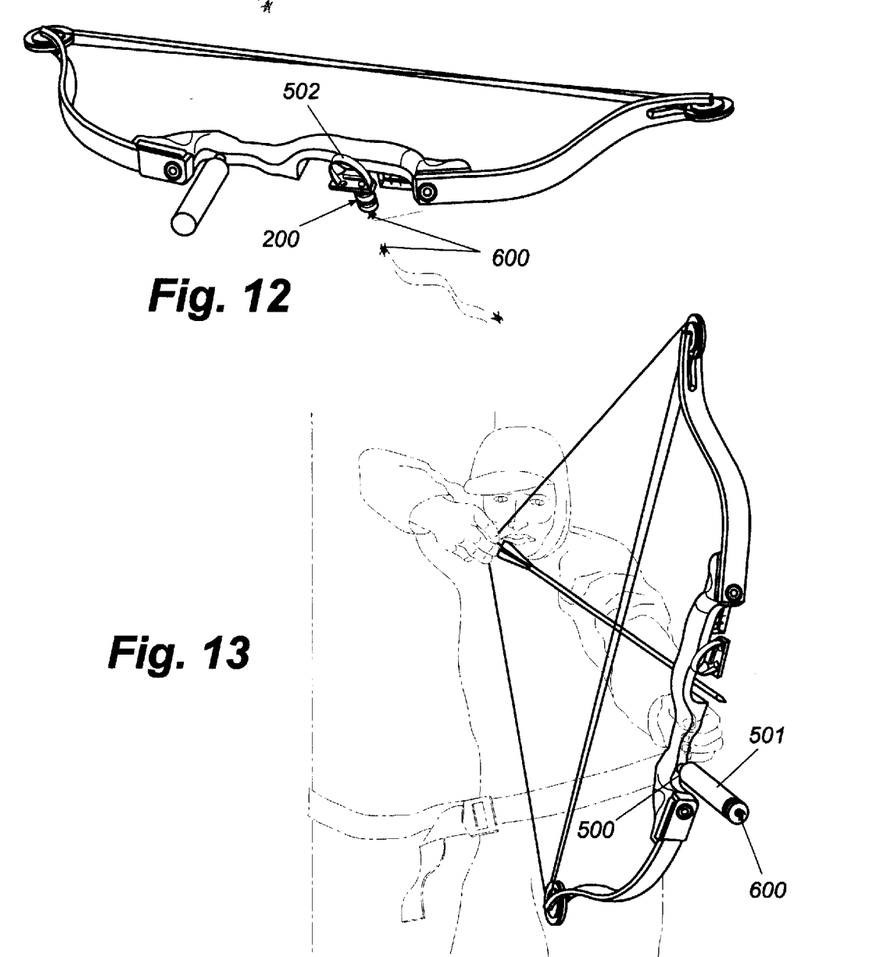
FIG. 12 is a schematic perspective view of a typical compound archery bow with an embodiment of the present invention shown attached or mounted to the archery bow sight mechanism.
FIG. 13 is an alternate perspective view of the embodiment of FIG. 11 as used with a typical archery bow.
Figure 14:
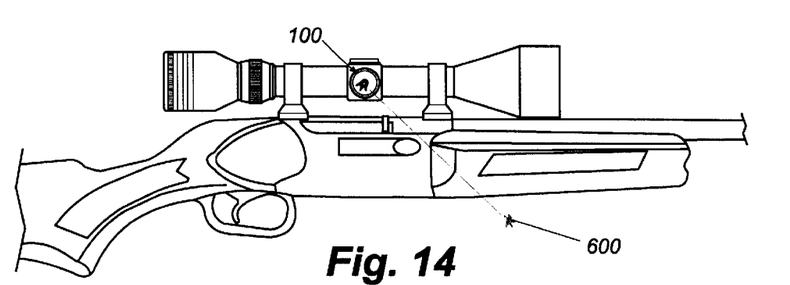
FIG. 14 is a plan view of a typical optical scope mounted to a firearm with an embodiment of the present invention attached to the windage adjustment mechanism of said scope.
Figure 15:
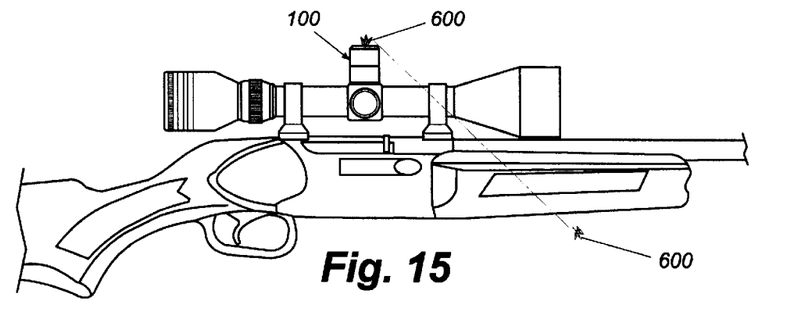
FIG. 15 is a plan view of a typical optical scope mounted to a firearm with an embodiment of the present invention attached to the elevation adjustment mechanism of said scope.

As shown in FIGS. 11, 12 and 13, and as previously stated, the wind detection aid 200 of FIG. 2 is designed to be attached to any one of the auxiliary attachment ports 500 of a typical archery bow or to the end of a typical bow stabilizer 501. The threaded male stud 212 of said wind detection aid 200 is machined so as to precisely mate with the female threads of said auxiliary attachment ports 500. Said ports 500 are installed on most archery bows for the attachment of bow stabilizers and other auxiliary equipment used by archers. As shown in FIGS. 11 and 12, the wind detection aid 200 of FIG. 2 may also be attached at the end of a typical bow stabilizer 501 or to the auxiliary port of a typical archery bow sight mechanism 502. As shown in FIG. 6, the wind detection aid 200 of FIG. 2 is designed for retrofit attachment to a typical archery bow stabilizer 501. The wind detection aid 200, as shown in FIG. 7, may also be incorporated into a typical archery bow stabilizer 501 during the manufacturing process as a permanent and an integral part thereof.

As with the embodiment of FIG. 1, as best seen in FIG. 13, the close proximity of the wind detection aid 200 of FIG. 2 to one's hands when the device 200 is attached to a typical archery bow or bow stabilizer, makes the device 200 very convenient to use and also limits or greatly reduces the movement required of the user when monitoring wind conditions. In use, an archery marksman, when desiring to check wind direction, wind speed or daily thermals, would simply remove a small bit of the fibrous material 600 from the cap 221 of said dispenser means 220 and would then release the material 600 into the ambient air for observation and tracking.

As with previous embodiments, the wind detection aid 300 of FIGS. 17 and 18 comprises a cylindrical receptacle means 310 and a dispenser means 320. The cylindrical receptacle means 310 of the embodiment of FIGS. 17 and 18 comprises a chamber means 311 at one end for housing a fibrous material 600 and an attachment means 330 at its other end for attaching the device 300 to an article of clothing or to a structural object such as a hunting or observation platform. As seen in FIG. 17, the attachment means 330 comprises a spring-loaded clip 331 for securing the device 300 to an article of clothing or similar material. In FIG. 18, the device 300 is shown attached to a typical hunting or observation platform or tree stand 340. The means 330 for attaching the device 300 to such structures may be of a removable or temporary nature such as the use of a suction cup or hook and loop material. The device 300 may also be attached to such structures by more permanent means such as by gluing, bolting, soldering or welding.

The fibrous material 600 contemplated for use with the present invention may be comprised of any lightweight fibrous material having a density or consistency such as would allow the fibers of the material 600 to be easily separated and, upon separation and release, would cause the fibers to have a tendency to float or to become airborne. The material 600 may also vary in color and density for easier detection in snowy conditions or where other weather related or environmental conditions may require higher visibility.

While the invention has been particularly shown and described with reference to the preferred embodiments thereof, it will be understood by those skilled in the art that various alterations in form, detail and construction may be made therein without departing from the spirit and scope of the invention.

The embodiments of the invention in which an exclusive property right or privilege is claimed are defined as follows:

1. A wind detection aid comprising:
   a fibrous wind-borne material;
   a receptacle for housing and dispensing said fibrous material and for attachment to a typical optical scope or to a typical archery bow or bow stabilizer having:
      a chamber means with one open end for receiving and housing said fibrous material;
      a means for attaching said receptacle to the windage or elevation adjustment mechanism of a typical optical scope or to a typical archery bow or bow stabilizer; and,
      a closure cap attached to the open end of said chamber means, said closure cap having one or more ports through which a portion of said fibrous material housed within said chamber means may be accessed and dispensed.

2. The aid of claim 1, wherein said receptacle is cylindrical in shape.

3. The aid of claim 1, wherein a portion of the external surface of said chamber means and a portion of the internal surface of said closure cap have been machined or adapted so as to create male and female threads, respectively, for securing said closure cap to the open end of said chamber means.

4. The aid of claim 1, wherein the means for attaching said receptacle to the windage or elevation adjustment mechanism of a typical optical scope comprises providing one end of said receptacle with female threads specially machined for mating with the male threads of a windage or elevation adjustment mechanism of a typical optical scope.

5. The aid of claim 1, wherein the means for attaching said receptacle to an archery bow or bow stabilizer comprises providing one end of said receptacle with a threaded male stud for mating with the female threads of an auxiliary attachment port of a typical archery bow or to the end of a typical bow stabilizer.

6. The aid of claim 1, wherein a portion of the external surface of said receptacle is knurled for better gripping when securing said receptacle to said scope, said bow or said bow stabilizer.

7. The aid of claim 1, wherein a portion of the external surface of said closure cap is knurled for better gripping when securing said closure cap to said receptacle.

8. The aid of claim 1, wherein said one or more ports include a singular circular opening or port centrally positioned along the top side of said cap.

9. A wind detection aid comprising:

a fibrous wind-borne material;

a dual-chambered receptacle means and a dispenser means;

wherein said receptacle means comprises a first chamber means having an open end for housing said fibrous material and a second chamber means for attaching the receptacle means to the windage or elevation adjustment mechanism of a typical optical scope;

wherein a portion of the external surface of said receptacle means is machined or adapted so as to create external or male threads for securing said dispenser means to the open end of said first chamber means;

wherein said second chamber means comprises internal or female threads for mating with the male threads of said windage or elevation adjustment mechanism of said typical optical scope;

wherein said dispenser means comprises a closure cap having one or more openings or ports through which a portion of said fibrous material housed within said first chamber means may be accessed and dispensed; and, wherein said closure cap further comprises a hollow chamber which has been machined or adapted so as to provide internal or female threads for mating with said external male threads of said receptacle means.

10. The aid of claim 9, wherein said receptacle means is cylindrical in shape.

11. The aid of claim 9, wherein a portion of the external surface of said receptacle means is knurled so as to provide for a better grip when securing said receptacle means to said optical scope.

12. The aid of claim 9, wherein a portion of the external surface of said dispenser means is knurled so as to provide for a better grip when securing said dispenser means to said receptacle means.

13. The aid of claim 9, wherein said one or more ports include a singular circular opening or port centrally positioned along the top side of said cap.

14. A wind detection aid comprising:

a fibrous wind-borne material;

a receptacle means and a dispenser means;

wherein said receptacle means comprises a chamber means having an open end for housing said fibrous material and a threaded male stud at its opposing end for attaching the receptacle means to a typical archery bow or a typical archery bow stabilizer;

wherein a portion of the external surface of said receptacle means is machined or adapted so as to create external or male threads for securing said dispenser means to the open end of said chamber means;

wherein said dispenser means comprises a closure cap having one or more openings or ports through which a portion of said fibrous material housed within said chamber means may be accessed and dispensed; and, wherein said closure cap further comprises a hollow chamber which has been machined or adapted so as to provide internal or female threads for mating with said external male threads of said receptacle means.

15. The aid claim 14, wherein said receptacle means is cylindrical in shape.

16. The aid of claim 14, wherein a portion of the external surface of said receptacle means is knurled so as to provide for a better grip when securing said receptacle means to said optical scope.

17. The aid of claim 14, wherein a portion of the external surface of said dispenser means is knurled so as to provide for a better grip when securing said dispenser means to said receptacle means.

18. The aid of claim 14, wherein said one or more ports include a singular circular opening or port centrally positioned along the top side of said cap.

* * * * *